United States Patent
Hollinger

(10) Patent No.: US 6,581,541 B2
(45) Date of Patent: Jun. 24, 2003

(54) PET BOWL WITH SUCTION CUP

(75) Inventor: Fred Hollinger, Kings Park, NY (US)

(73) Assignee: E&B Giftware LLC, Yonkers, NY (US)

( * ) Notice: Subject to any disclaimer, the term of this patent is extended or adjusted under 35 U.S.C. 154(b) by 0 days.

(21) Appl. No.: 10/139,819

(22) Filed: May 2, 2002

(65) Prior Publication Data

US 2002/0162511 A1 Nov. 7, 2002

Related U.S. Application Data

(60) Provisional application No. 60/288,412, filed on May 3, 2001.

(51) Int. Cl.⁷ .............................................. A01K 1/00
(52) U.S. Cl. ....................................................... 119/61
(58) Field of Search .................. 119/61; 1/72; 248/205.8

(56) References Cited

U.S. PATENT DOCUMENTS

| | | | |
|---|---|---|---|
| 2,542,400 A | | 2/1951 | Donofrio |
| 2,969,890 A | | 1/1961 | Udell |
| 3,276,734 A | * | 10/1966 | Goldblatt ................. 248/176.1 |
| D209,755 S | | 1/1968 | Robert |
| 3,638,878 A | * | 2/1972 | Morris ...................... 242/129.8 |
| 3,750,991 A | * | 8/1973 | Ragir ........................ 248/205.8 |
| 4,432,451 A | * | 2/1984 | Hooser ......................... 206/216 |
| 4,694,973 A | * | 9/1987 | Rose et al. ..................... 221/46 |
| 5,000,123 A | | 3/1991 | Morse et al. |
| 5,087,005 A | * | 2/1992 | Holoff et al. ............ 248/205.8 |
| D333,886 S | | 3/1993 | Kennedy |
| 5,318,262 A | * | 6/1994 | Adams ..................... 248/205.8 |
| 5,592,244 A | * | 1/1997 | Vyhmeister .................. 351/158 |
| 6,167,840 B1 | | 1/2001 | White et al. |
| 6,193,197 B1 | * | 2/2001 | Lian .......................... 248/206.2 |
| 6,209,487 B1 | * | 4/2001 | Quinlan et al. ........... 119/51.01 |
| 6,308,923 B1 | * | 10/2001 | Howard .................... 248/205.5 |
| 6,318,683 B1 | * | 11/2001 | Savoy ........................ 248/146 |
| D459,841 S | * | 7/2002 | Ross .......................... D30/129 |
| 6,422,402 B1 | * | 7/2002 | Hollinger ..................... 211/50 |
| 6,443,388 B1 | * | 9/2002 | Hollinger ................. 242/597.7 |

FOREIGN PATENT DOCUMENTS

| | | |
|---|---|---|
| DE | 3736232 A1 | 6/1987 |
| FR | 2627052 A1 | 8/1989 |

\* cited by examiner

*Primary Examiner*—Charles T. Jordan
*Assistant Examiner*—Jordan M Lofdahl
(74) *Attorney, Agent, or Firm*—Gerard F Dunne

(57) ABSTRACT

A pet bowl having an interior dished portion for receiving pet food, water or the like has a rather large suction cup held centrally to the underside of the pet bowl for securing the bowl to a surface such as a floor. The suction cup underlies at least a major portion of the lateral extent of the dished portion of the bowl, and may be held removably to the pet bowl by a bracket. The surface of the suction cup preferably has upstanding portions to engage the undersurface of the bracket to depress the suction cup assuredly upon downward movement of the bowl. The bracket may have a keyed opening, and a knob with an enlarged end extends upwardly from the suction cup and may be fitted within the keyed opening to hold the suction cup removably to the bracket. Further, a tab may extend from the rim portion of the suction cup to be accessed through an opening in the sidewall of the pet bowl for enabling the rim of the suction cup to be lifted and release the suction cup from the floor.

8 Claims, 5 Drawing Sheets

PET BOWL WITH SUCTION CUP

PRIOR APPLICATION

This application is based on provisional application No. 60/288,412 filed May 3, 2001, and claim is made for the benefit of the filing date of the provisional application

FIELD OF THE INVENTION

The present invention relates to a pet bowl having a suction cup attached to its base to secure the pet bowl to a floor during use.

BACKGROUND OF THE INVENTION

Bowls for holding food or water for pets such as dogs are well known, and typically the bowls are formed of a side wall adapted to be rested onto a kitchen floor or the like with an interior dished portion for holding food or water. In use, the pet will place his muzzle in the dished portion and often cause the bowl to slide along the floor. To help secure the pet bowl onto the floor or other supportive surface, it has been proposed to provide a plurality of suction cups on the bottom of the pet bowl, as shown, for example in U.S. Pat. No. 5,00,123 to Morse et al., U.S. Pat. No. 6,167,840 granted to White et al. and U.S. Pat. No. Des. 333,886 to Kennedy.

The multiple suction cups are each relatively small in comparison to the pet bowl, and individual suction cups may be come dislodged as the pet bowl is in use by a feeding animal.

It is, therefore, an object of the present invention to provide a pet bowl that may be placed on a surface such as a floor and better held in place during use.

SUMMARY OF THE INVENTION

According to the present invention, a pet bowl having an interior dished portion for receiving pet food, water or the like has a suction cup held centrally to the underside of the pet bowl for securing the bowl to a surface such as a floor. The suction cup underlies at least a major portion of the lateral extent of the dished portion of the bowl, and the suction cup may be held removably to the bowl by a bracket. Additionally, the surface of the suction cup may have upstanding portions to engage the undersurface of the bracket to depress the suction cup assuredly upon downward movement of the bowl.

The bracket may have a keyed opening, and a knob with an enlarged end may extend upwardly from the suction cup to be fitted within the keyed opening and thereby hold the suction cup removably to the bracket. In this way, the suction cup can be removed and the pet bowl placed, for example, in a dish washer for cleaning without needing to expose the suction cup to the hash environment of an automatic dish washer.

Further, a tab upstanding from the rim portion of the suction cup may be accessed through an opening in the sidewall of the pet bowl for enabling the rim of the suction cup to be lifted and release the suction cup from the floor.

These and other objects, advantages and features of the present invention will become apparent from the description given below of a preferred embodiment, which description is made in conjunction with the following drawing figures, in which.

Figure 1:
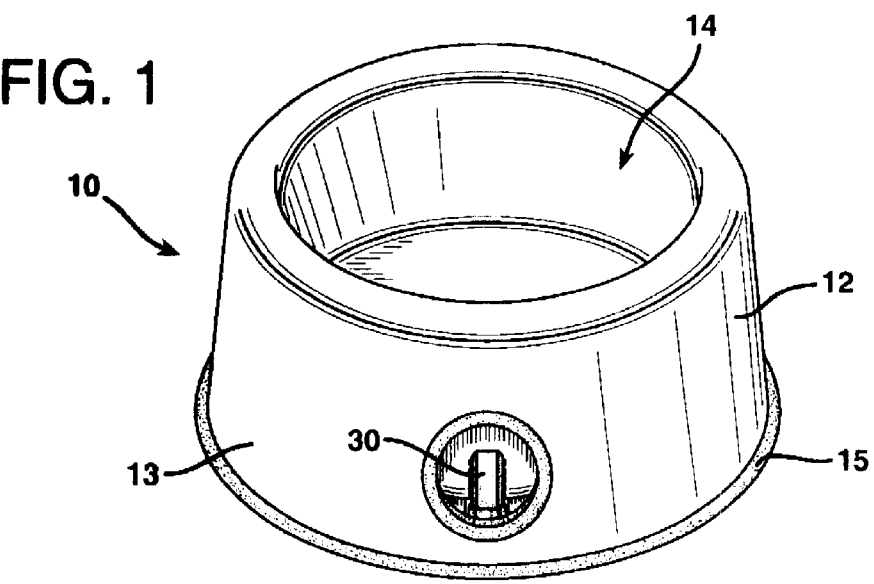
FIG. 1 is a perspective view of a pet bowl of the present invention.
Figure 2:
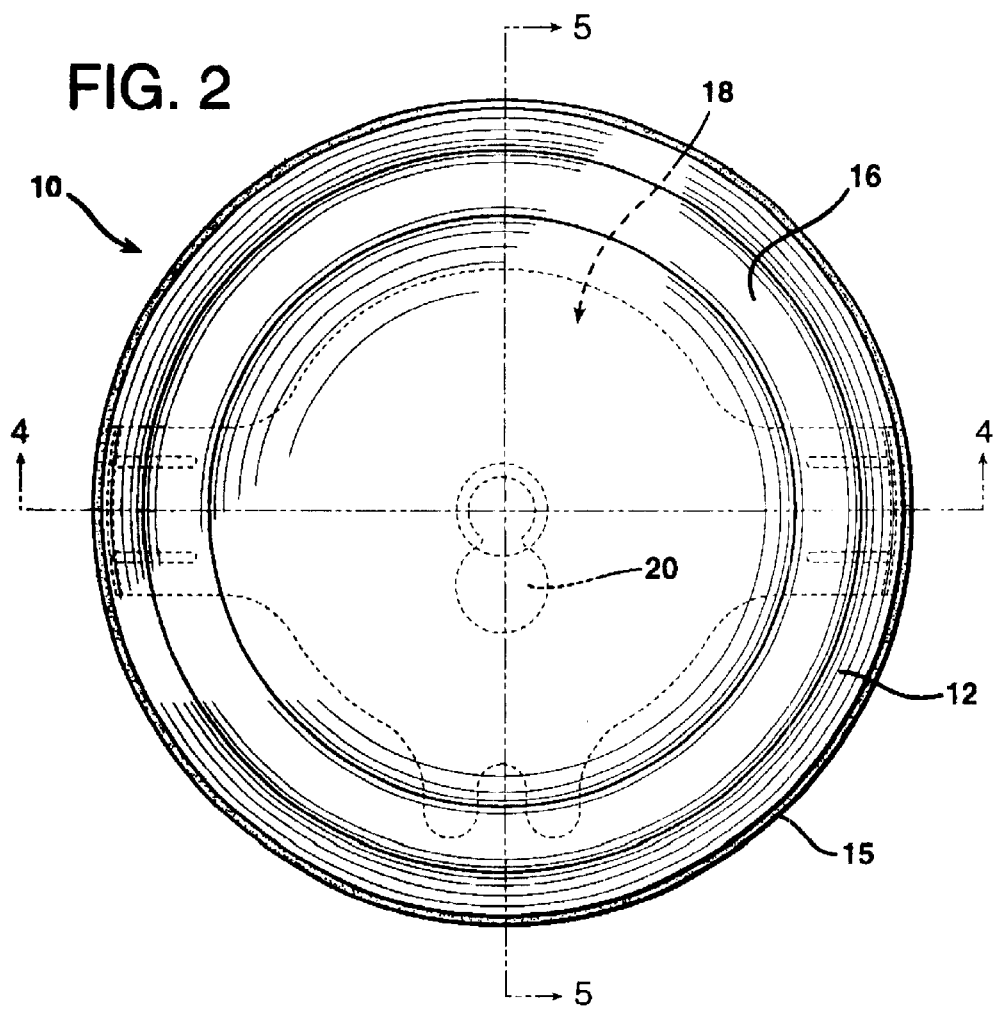
FIG. 2 is an elevational view of the underside of the pet bowl of FIG. 1, illustrating the bracket in phantom.

As illustrated in FIG. 1, a pet bowl 10 of the present invention includes a sloping side wall 12 leading to a central dished portion 14. Preferably, the side wall and dished portion are formed integrally from a molded material or a decorative stamped metal such as stainless steel. The lower rim 13 of the sidewall 12 may be fitted with a rim element 15 of an elastomeric material to aid in reducing slippage of the pet bowl when placed on a floor or other supportive surface.

In order to hold the pet bowl 10 to a kitchen floor or the like, fitted centrally within the side wall 12 is an elastomeric device to provide suction; and preferably a dome-shaped suction cup 16 formed of an elastomeric material is held within the side wall by a bracket 18 fixed to the interior of the sidewall. The bracket 18 has a generally domed-shaped central portion 18a overlying the suction cup and a central opening 20.

Figure 4:
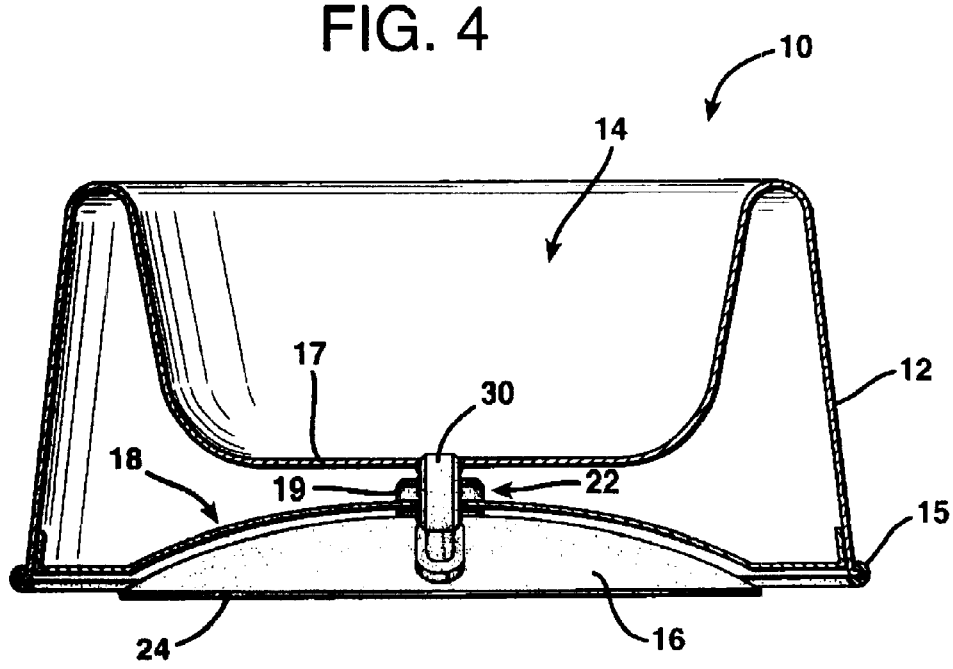
FIG. 4 is a view of a pet bowl of FIG. 1 partly in section.

The suction cup 16 underlies at least a major portion of the lateral extent of the dished portion 14 of the pet bowl, and as shown in FIG. 4, the suction cup 16 may extend beyond the lateral extent of the bottom portion 17 of the dished portion 14. It should be understood that larger pet bowls may have the lateral extent of the bottom of the dished portion extend beyond the outer rim of the suction cup. What is important, however, is that suction cup underlie at least a major portion of the lateral extent of the dished portion of the pet bowl.

Figure 7:
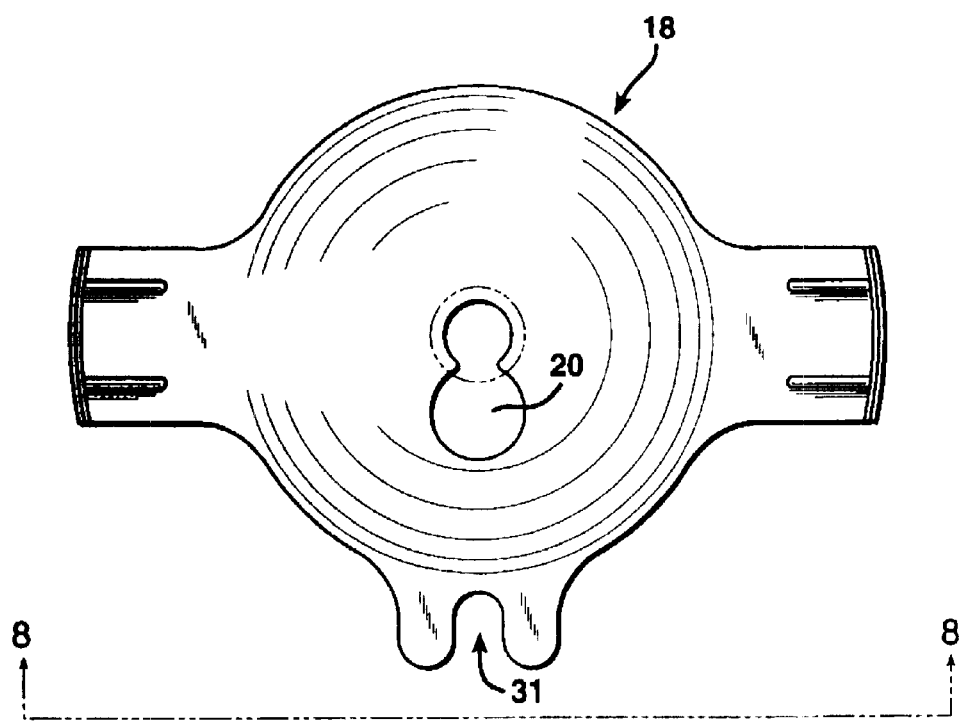
FIG. 7 is an elevational view of the bracket.
Figure 8:
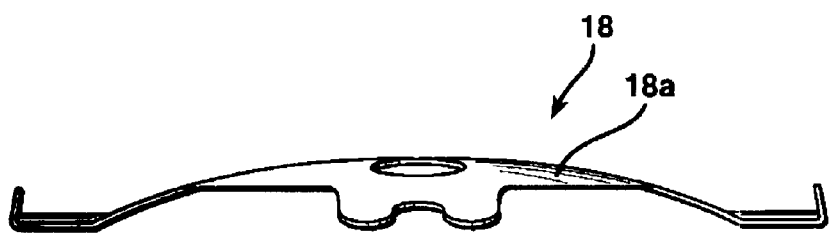
FIG. 8 is a side elevational view of the bracket of FIG. 7.
Figure 9:
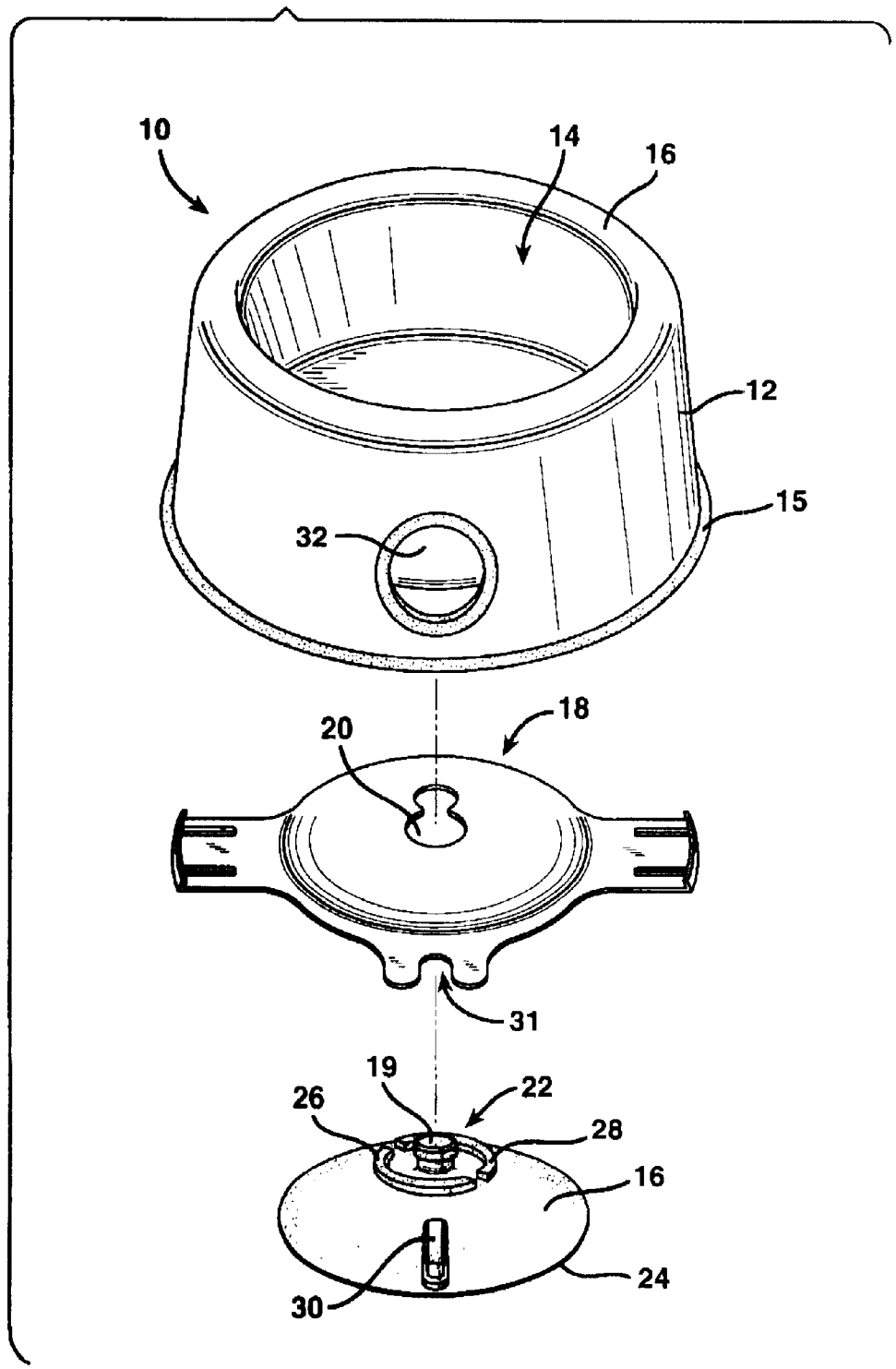
FIG. 9 is an exploded view of the pet bowl of FIG. 1.

As can be seen in FIGS. 7 and 9, the opening 20 formed centrally within the bracket 18 may be key-shaped; and an upstanding elastomeric knob 22 extends upwardly from the central portion of the suction cup 16 and has an enlarged end portion 19 which may be inserted and slid through the keyed opening 20 to secure the suction cup 16 removably to the bracket 18. Alternatively, opening 20 may be circular and elastomeric knob 22 may be press-fitted through the opening.

Figure 3:
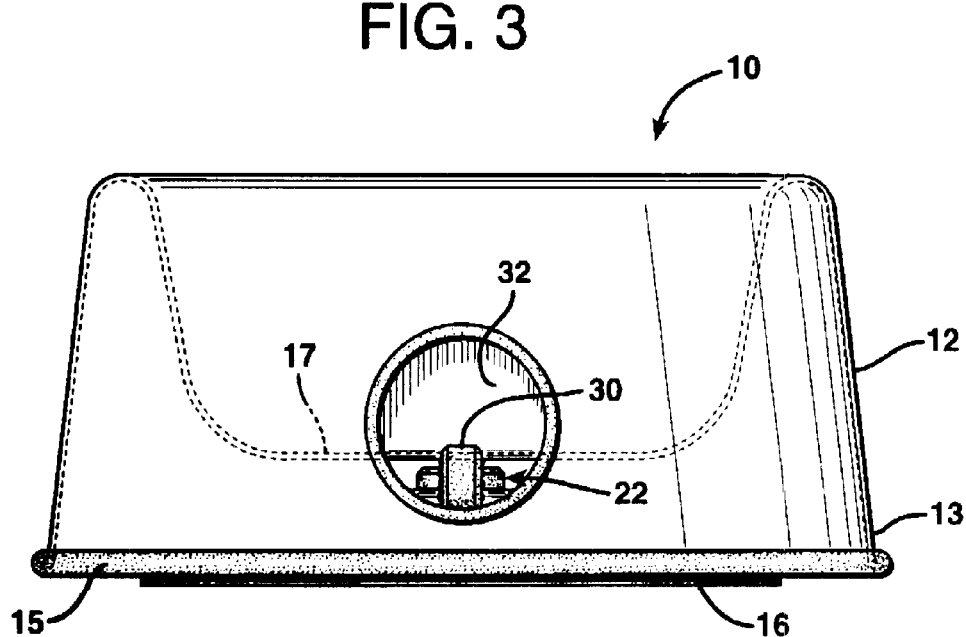
FIG. 3 is a side elevational view of the pet bowl of FIG. 1.
Figure 5:
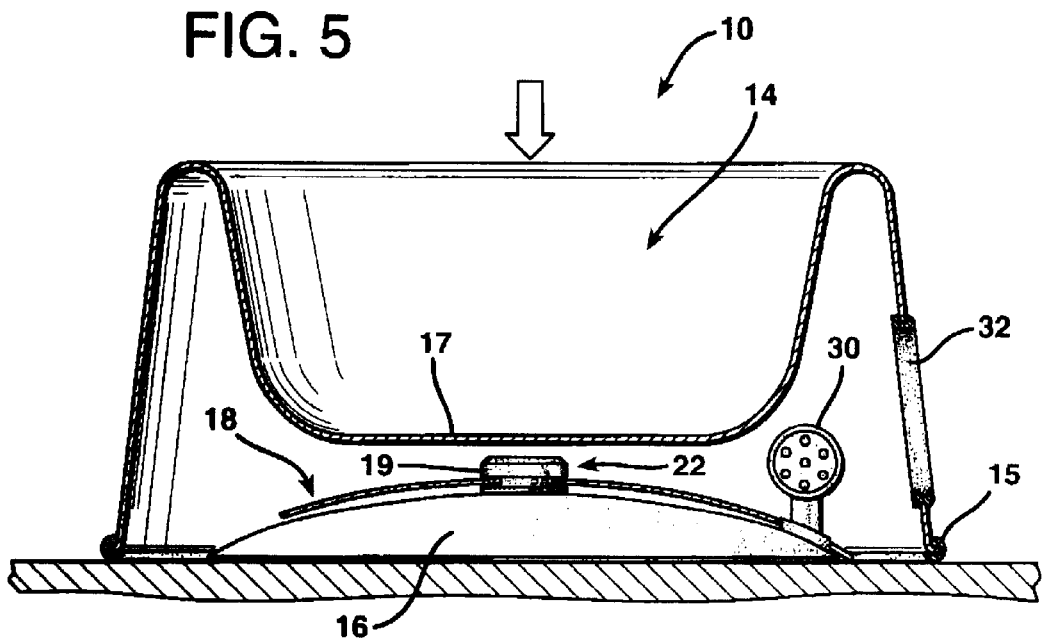
FIGS. 5 and 6 illustrate operation of the pet bowl of the present invention.

The rim portion 24 of the suction cup 16 extends below the lower edge of the side wall 12 of the pet bowl as shown in FIGS. 3 and 4, and placing the pet bowl on a supportive surface such as a kitchen floor and pressing downwardly as illustrated in FIG. 5 will flatten the suction cup to hold the pet bowl to the surface. By use of a central suction cup that underlies at least a major portion of the lateral extent of the dished portion 14 of the pet bowl, pressing the pet bowl downwardly through the central portion of the dished portion 14 will enable the pet bowl to be held to a kitchen floor or the like simply and quickly without the need to depress a plurality of smaller suction cups.

In use, a pet such as a dog, may then push on the pet bowl while drinking water or eating food placed in the dished portion 14, and the pet bowl will likely be held in place to avoid spillage and movement of the pet bowl, and will not easily be worked loose.

The suction cup 16 has upstanding projections 26 and 28 adapted to engage the undersurface of the bracket 18. In this way, downward movement of the pet bowl 10 will cause the underside of the bracket 18 to press firmly against the projections 26 and 28 and assuredly depress the suction cup to a floor surface or the like. The projections 26 and 28 may, as illustrated, be a pair of semi-circular ridges arranged concentrically around the knob 22.

Figure 6:
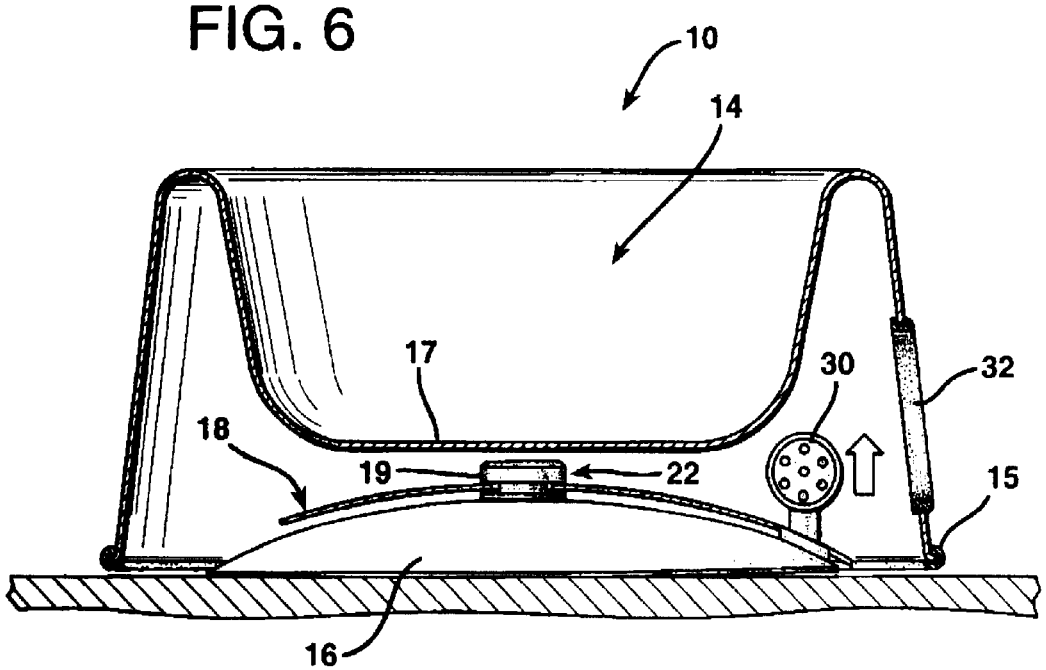

A tab 30 is connected integrally to the rim portion 24 of the suction cup 16 and extends through a slotted opening 31 in the bracket 18; and may be accessed through an opening 32 in the side wall 12 of the pet bowl. After the pet bowl 10 has been secured and placed on a surface such as a kitchen floor by being pressed forcibly downward to provide a suction gripping the surface; the suction can be released by the user simply grasping the tab 30 and lifting as illustrated in FIG. 6 to separate the adjacent lip of the rim portion of the suction cup from the surface to release the suction and enable the pet bowl to be removed.

These and other objects, advantages and features of the present invention will be understood from the detailed description of a preferred embodiment made above; however, the present invention is not limited by any details of the above but is set forth by the appended claims.

What is claimed is:

1. A bowl for holding material to be consumed by a pet, including a dished portion for receiving material to be consumed, and a suction cup held centrally beneath said dished portion and extending to underlie at least a major portion of the lateral extent of the dished portion of the bowl and adapted to be secured to a support surface to hold the pet bowl in place as a pet consumes material within said dished portion, said suction cup being held to a bracket held to said bowl beneath said dished portion, said suction cup having an upstanding knob adapted to be fitted through an opening in said bracket, and projections being formed by a pair of semi-circular ridges arranged concentrically about said knob.

2. A bowl for holding material to be consumed by a pet, including a dished portion for receiving material to be consumed, and a suction cup held centrally beneath said dished portion and extending to underlie at least a major portion of the lateral extent of the dished portion of the bowl and adapted to be secured to a support surface to hold the pet bowl in place as a pet consumes material within said dished portion, said suction cup being held to a bracket held to said bowl beneath said dished portion, said bracket being domed shape to conform generally to the contours of said suction cup.

3. A bowl as set forth in claim 2, said bowl having an opening, and a tab upstanding from said suction cup and adapted to be engaged through said opening for releasing the suction cup from the surface.

4. A bowl as set forth in claim 2, said suction cup having an upstanding knob adapted to be fitted through an opening in said bracket, and projections being formed by a pair of semi-circular ridges arranged concentrically about said knob.

5. A bowl as set forth in claim 4, said opening being a key-shaped slot whereby said suction cup is removable.

6. A bowl for holding material to be consumed by a pet, including a dished portion for receiving material to be consumed, and a suction cup held centrally beneath said dished portion and extending to underlie at least a major portion of the lateral extent of the dished portion of the bowl adapted to be secured to a support surface to hold the pet bowl in place as a pet comsumes material within said dished portion, said suction cup being held to a bracket held to said bowl beneath said dished portion, said suction cup having an upstanding knob adapted to be fitted through an opening in said bracket, said opening being a key-shaped slot whereby said suction cup is removable.

7. A bowl as set forth in claim 6, and projections being formed by a pair of semi-circular ridges arranged concentrically about said knob.

8. A bowl as set forth in claim 6, said bowl having an opening, and a tab upstanding from said suction cup and adapted to be engaged through said opening for releasing the suction cup from the surface.

* * * * *